Nov. 3, 1931.   R. BRINDLE, JR   1,830,222
MACHINE FOR STRETCHING COILS
Filed June 4, 1929   9 Sheets-Sheet 2
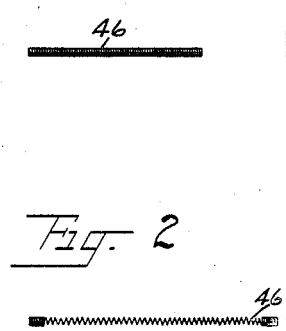
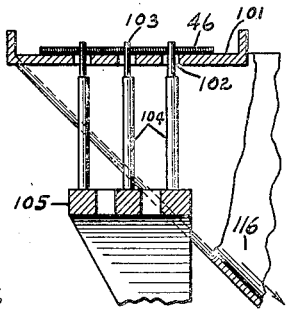
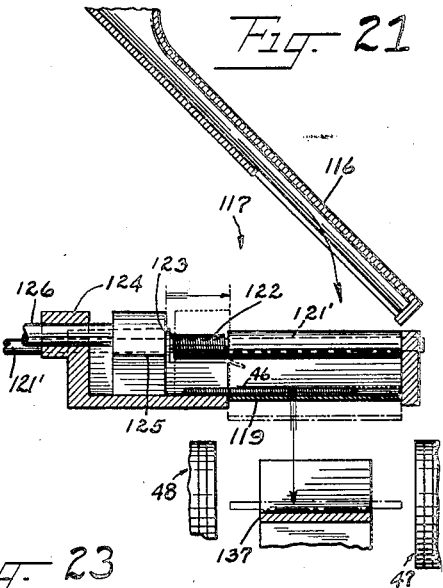
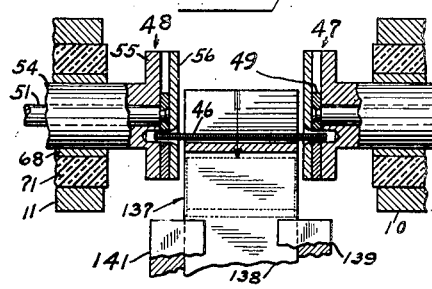
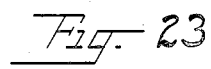
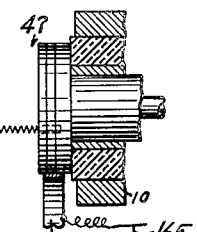
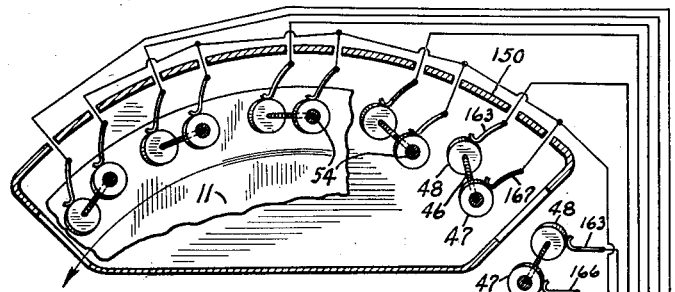
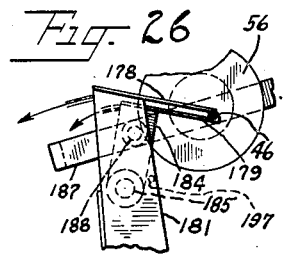
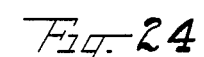
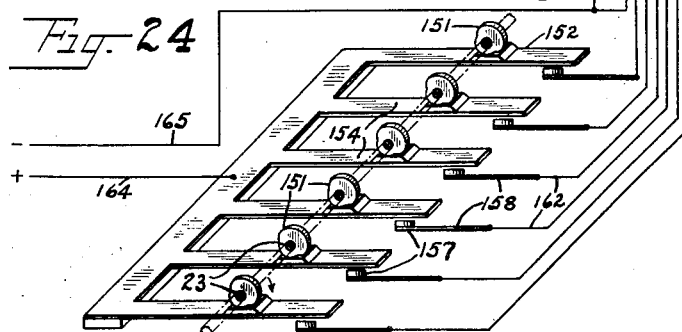
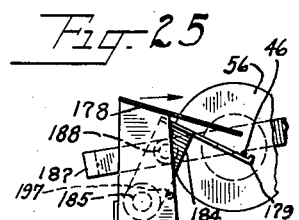
INVENTOR
R. BRINDLE Jr.
BY
ATTORNEY

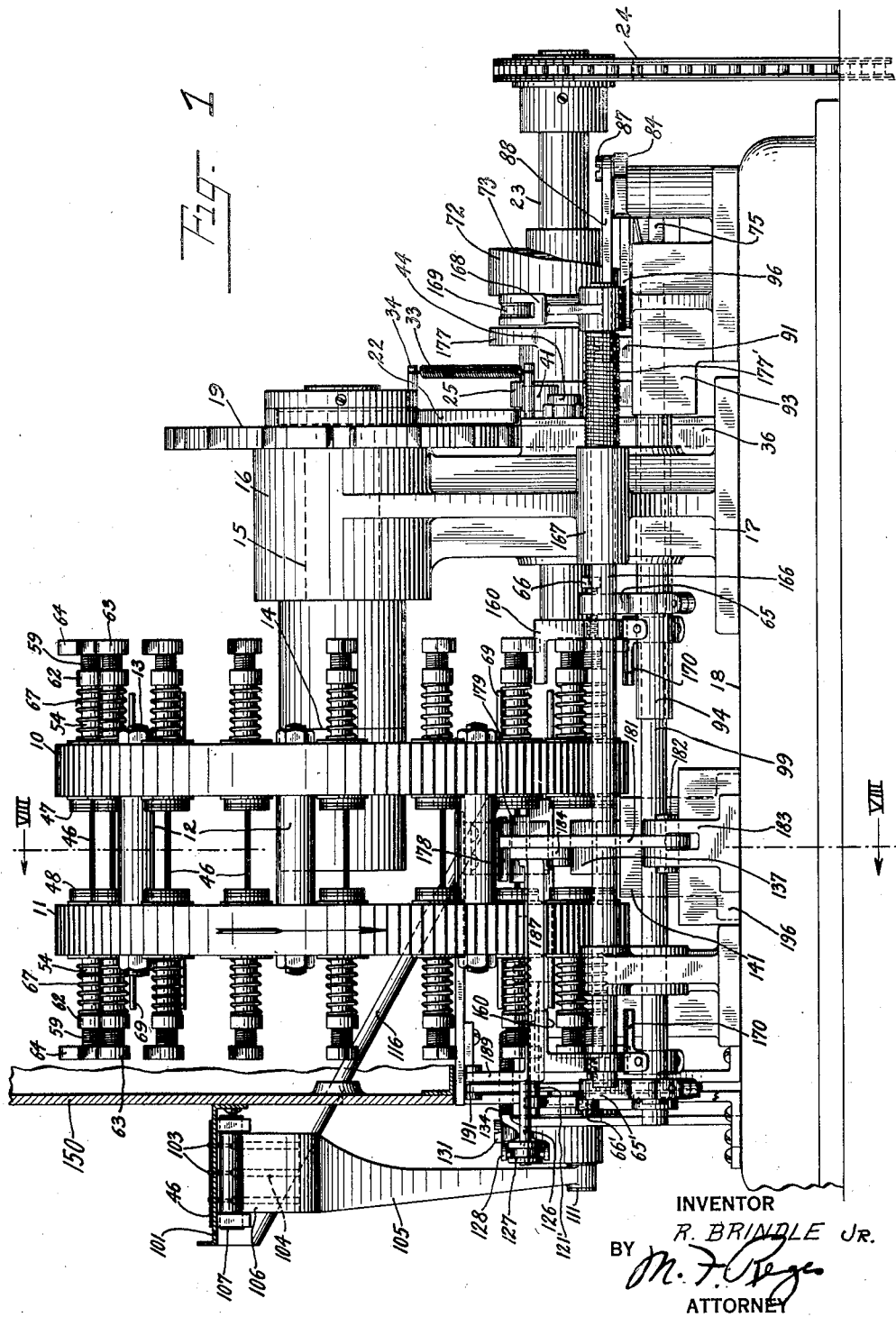

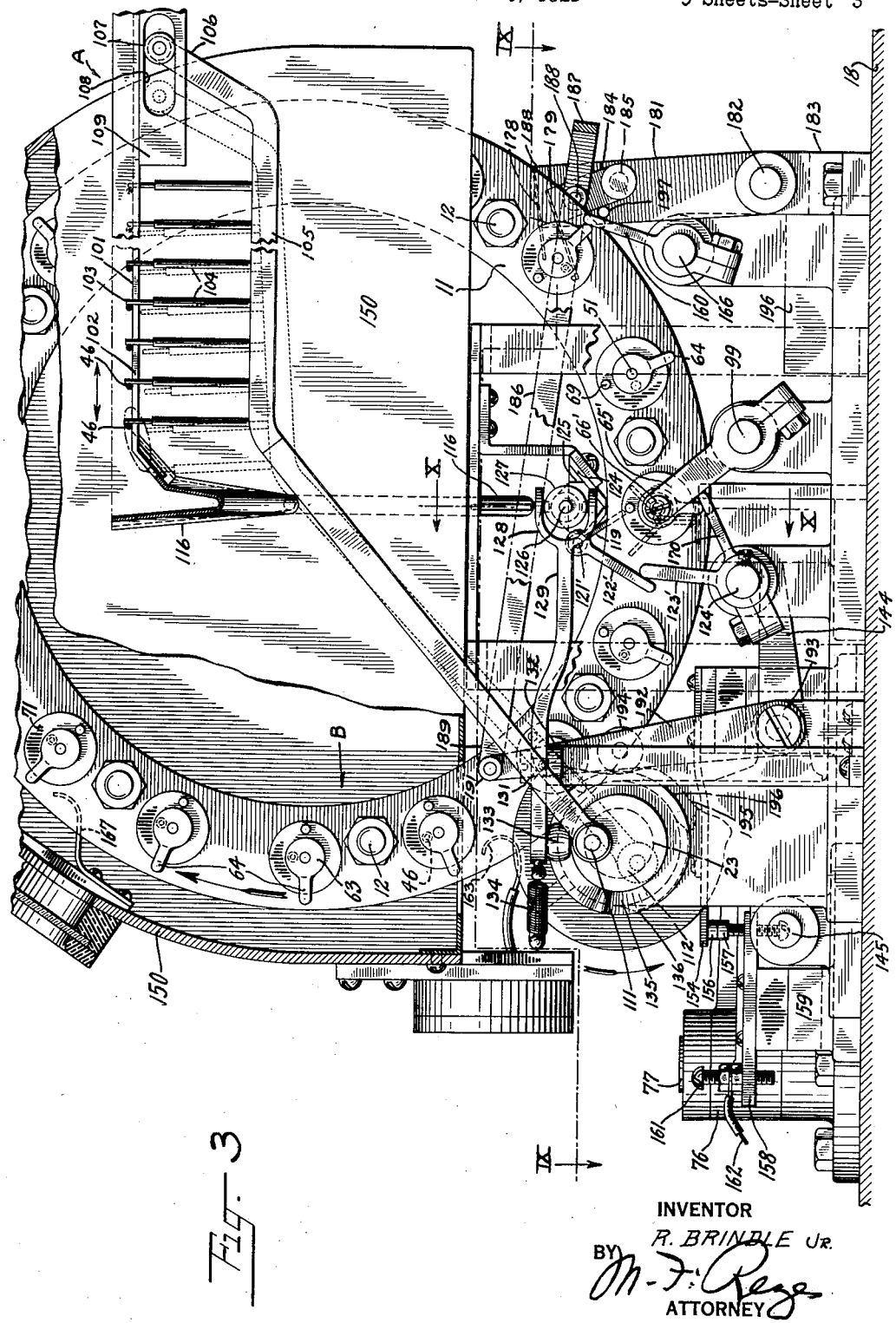

Nov. 3, 1931.  R. BRINDLE, JR  1,830,222
MACHINE FOR STRETCHING COILS
Filed June 4, 1929  9 Sheets-Sheet 4
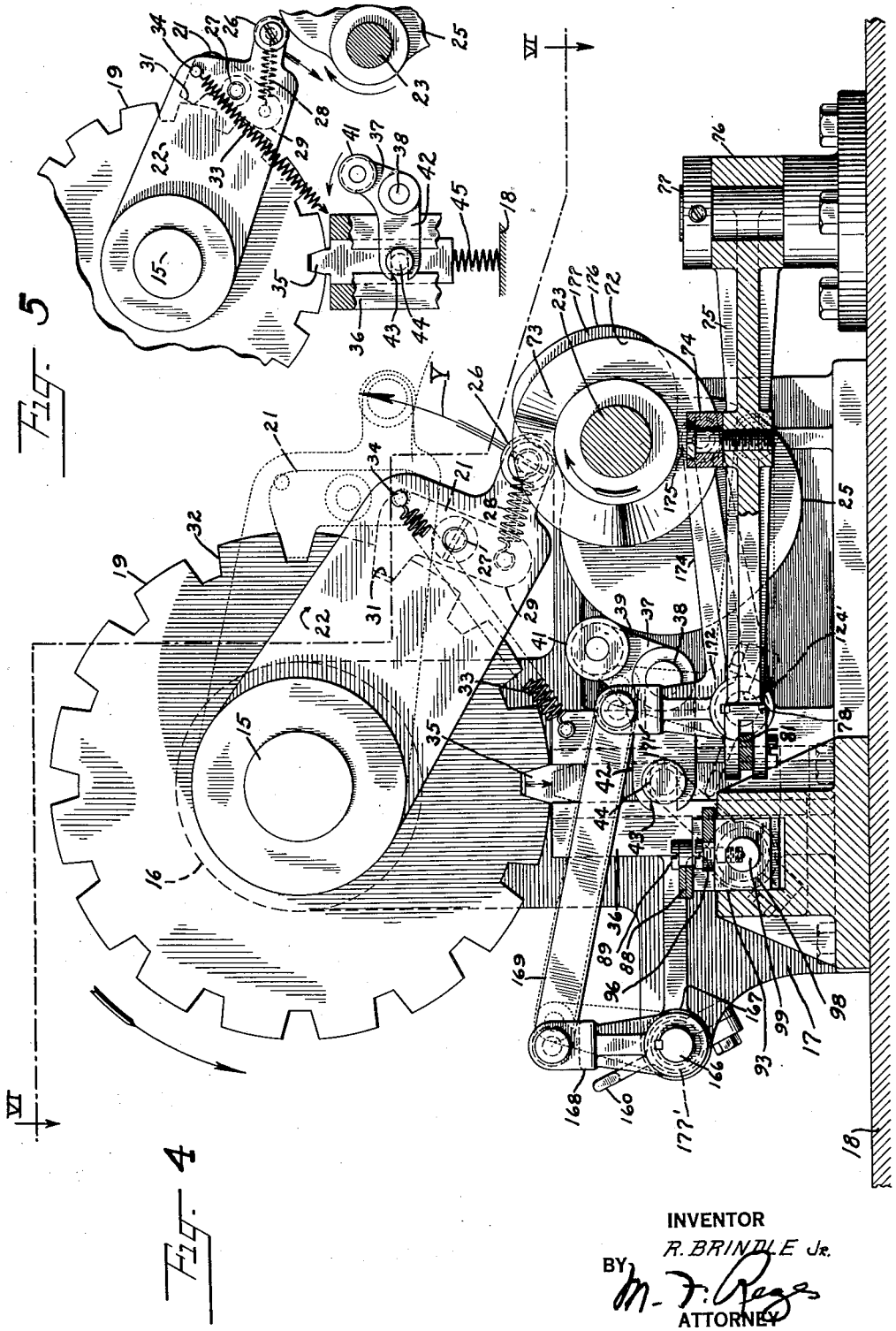
INVENTOR
R. BRINDLE Jr.
BY
ATTORNEY Nov. 3, 1931.  R. BRINDLE, JR  1,830,222
MACHINE FOR STRETCHING COILS
Filed June 4, 1929  9 Sheets-Sheet 5
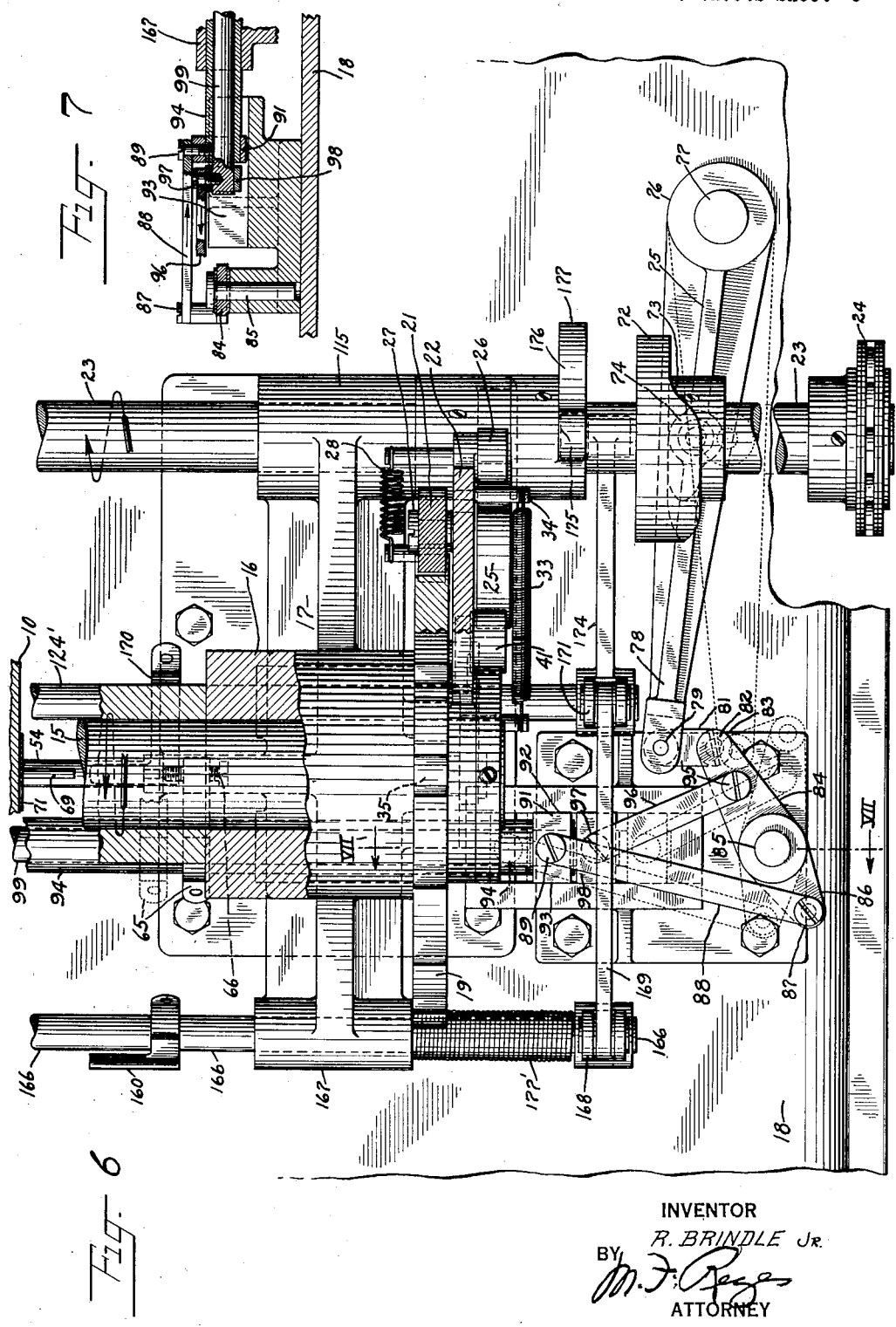
INVENTOR
R. BRINDLE JR.
BY
ATTORNEY

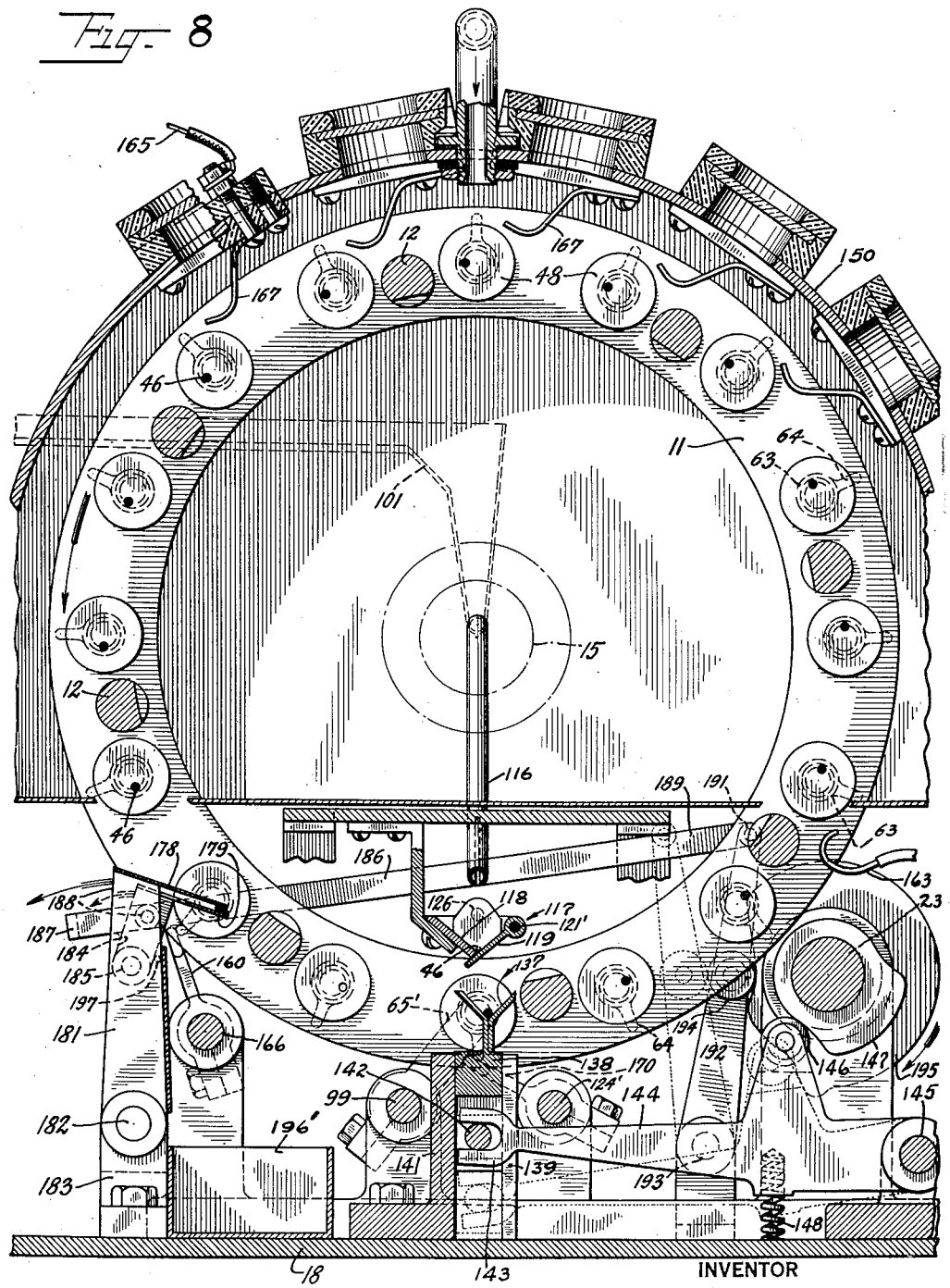

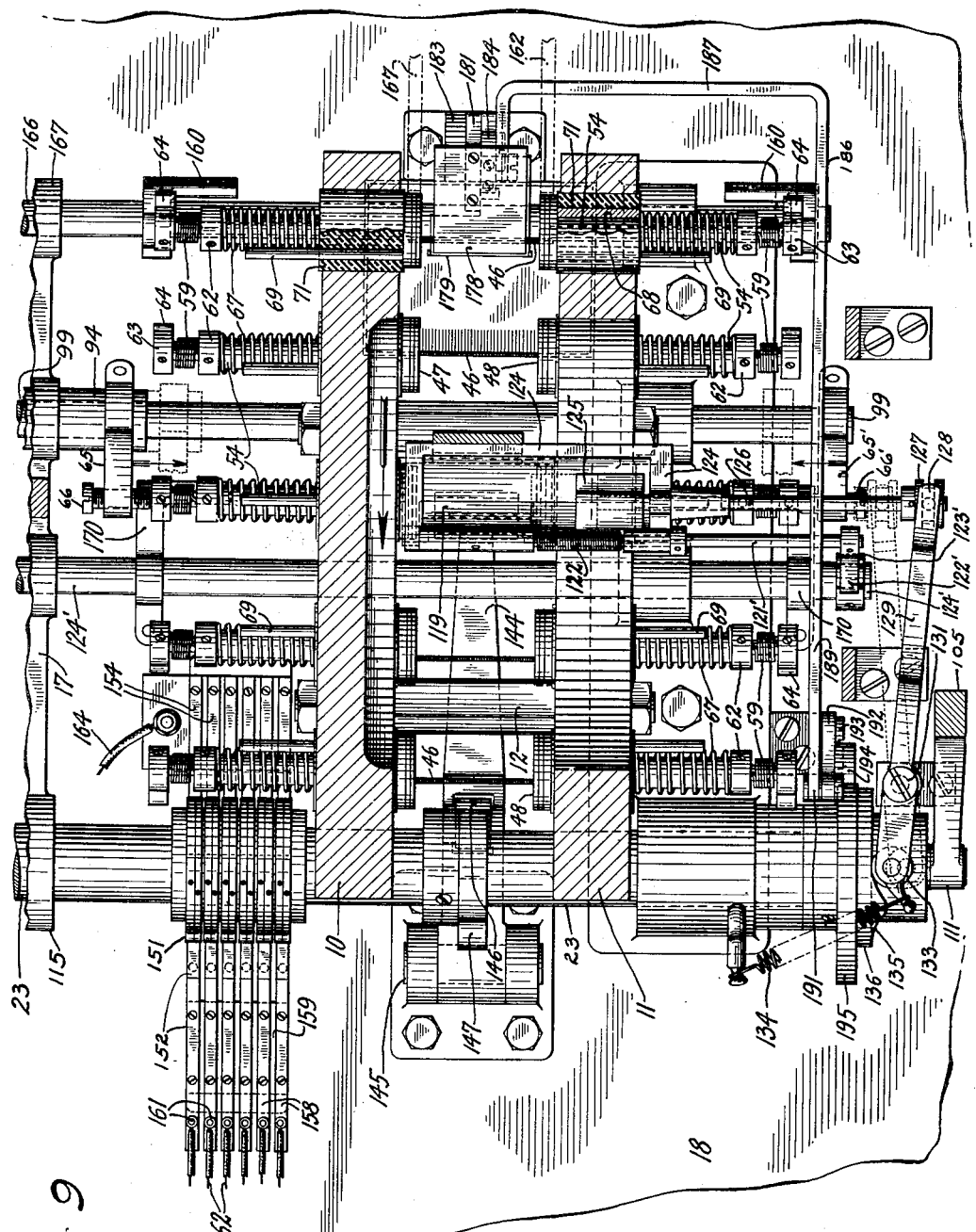

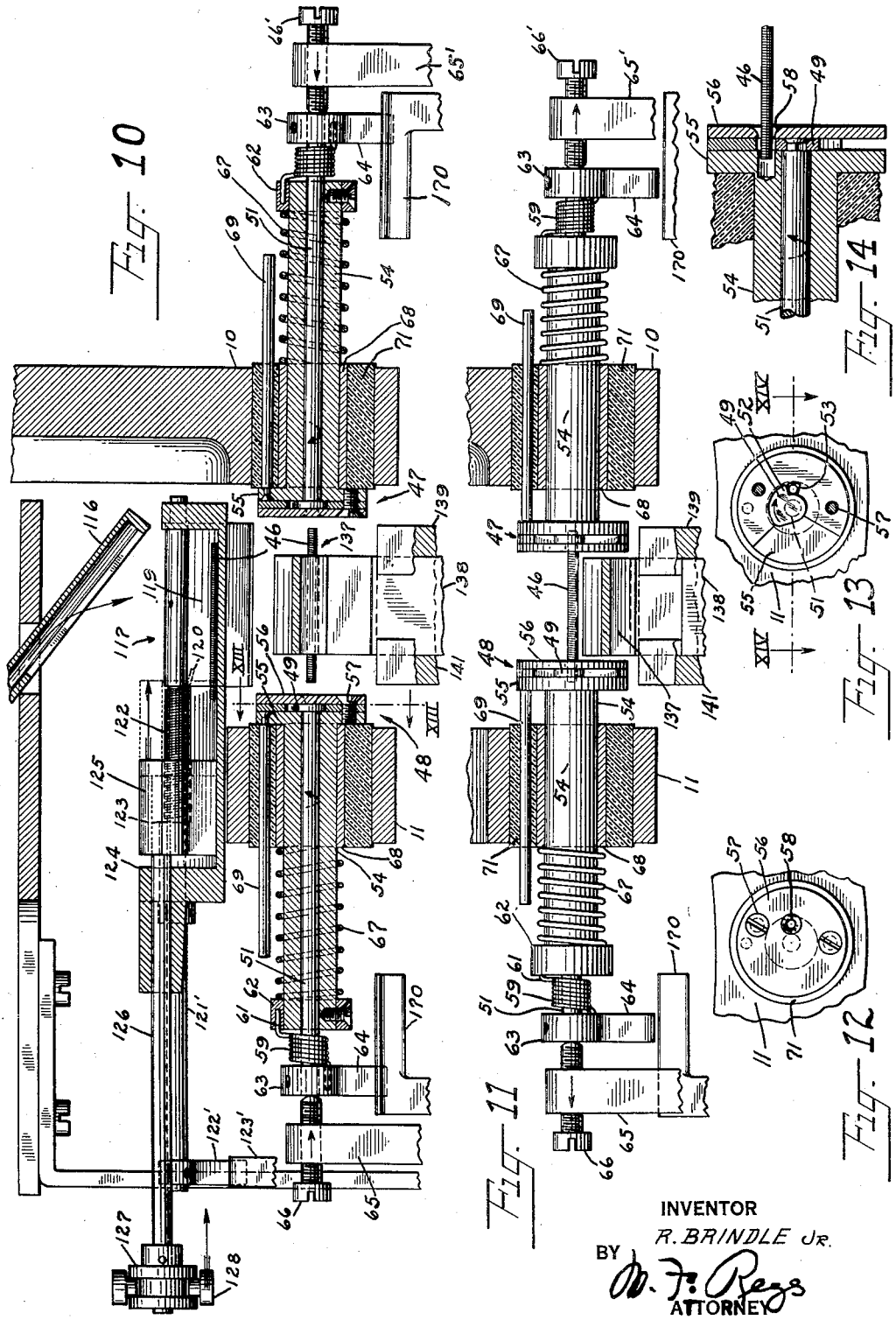

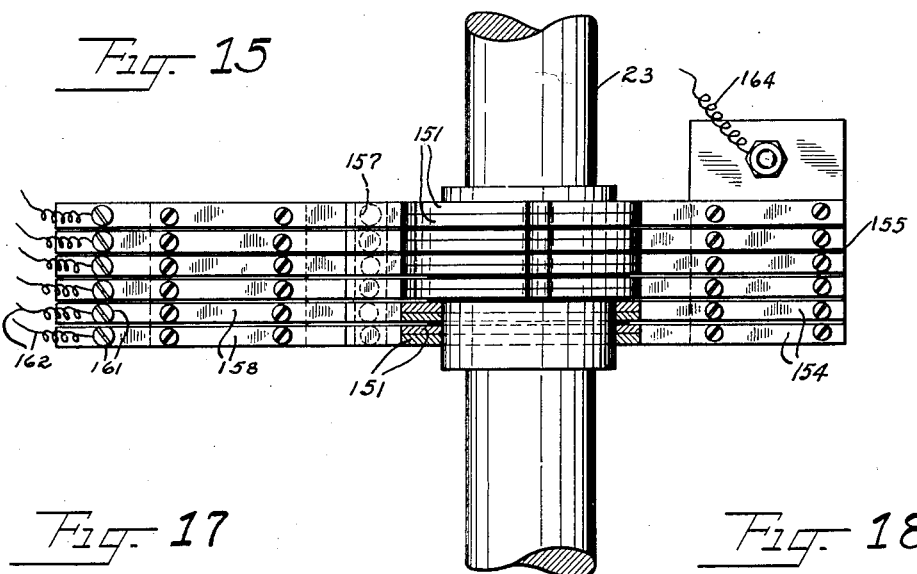
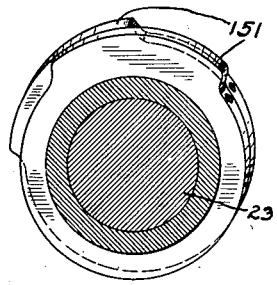
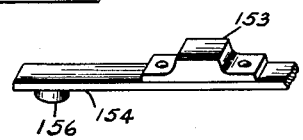
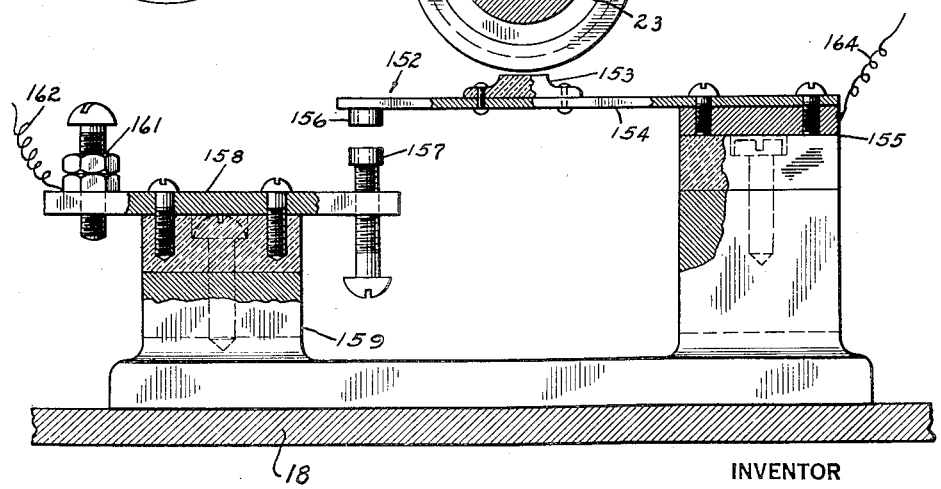

Patented Nov. 3, 1931

1,830,222

UNITED STATES PATENT OFFICE

ROBERT BRINDLE, JR., OF EDGEWOOD, RHODE ISLAND, ASSIGNOR TO WESTINGHOUSE LAMP COMPANY, A CORPORATION OF PENNSYLVANIA

MACHINE FOR STRETCHING COILS

Application filed June 4, 1929. Serial No. 368,311.

This invention relates to the manufacture of incandescent electric lamps and relates more particularly to the production of coiled filaments of a definite length for use in such lamps.

The manufacture of incandescent electric lamps includes lamps having a straight wire filament and lamps which include a coiled filament consisting of a fine refractory wire wound to helical form to provide a light source.

The present invention is concerned with the last mentioned type of filament which is generally known in the art as the concentrated type, the same being adapted for use in either a gas filled or an evacuated bulb.

The coiling of a lamp filament to provide a light source is an important and exacting operation in the lamp making art and in the production of such filaments, two methods of winding are employed. First, the method of winding a filament wire upon a mandrel, cutting the mandrel containing helix into definite lengths or sections and subsequently removing the mandrel to provide coiled filamentary sections to constitute lamp filaments. The second method consists in the coiling of a filamentary wire to helical form in the absence of a mandrel which filament is severed into the proper length sections.

It will be appreciated that when a light source or filamentary section is produced for use in a lamp of a given wattage certain conditions must be carefully observed and strictly adhered to. The length of the selected filamentary wire contained in the light source must be exact so that the proper resistance will be obtained for a given wattage.

It is important that each length of filament contain a helix of a given number of turns and that the pitch of the helix be maintained uniform and the outside diameter of the helix held constant, although it is possible to provide coiled filamentary sections having a definite length of wire therein, it is not always practical to produce these coiled sections having uniform over-all lengths, i. e., the length measured between the end turns.

Ordinarily if filamentary sections are produced with uniform amounts of wire therein and with the pitch and diameter of uniform dimensions, such filaments answer all requirements heretofore attending lamp manufacture.

High speed production in connection with lamp manufacture has, however, made it desirable to provide machines for automatically mounting coiled sections and mechanism is provided for handling the coiled sections, positioning them and clamping or welding the ends to lead wires of a lamp stem. The automatic mounting of lamp filaments makes it necessary to maintain the filaments of uniform over-all lengths so that when positioned to be received by mechanism for performing the automatic mounting operation the means, such as the jaws, which grip the ends of the filament, may be given a fixed position and the filaments fed thereto without a failure of the jaws to grip the filament by reason of either too long or too short filament lengths.

It will be evident that where the jaws are positioned to grip a filament of a certain length, any variation in this filament length will result in the jaws either failing to grip the end of the filament or in the application of too great a portion of the filament end being applied between the jaws.

For the purpose of producing filaments with predetermined over-all lengths it has been found desirable to produce a filament of a given pitch and length and thereafter stretch the filament to a predetermined pitch and length. A method for accomplishing the above is clearly set forth in copending application Serial No. 329,149, filed December 29, 1928 for "method of producing uniform length filaments and articles produced thereby", which application is assigned to the present assignee.

The present invention relates to a machine for practicing the above method and has for its object the provision of mechanism for performing the stretching operation in a rapid and efficient manner.

Another object of the invention is to provide co-related machine elements for receiving a coiled filamentary section, stretching the same and subjecting the stretched section to a heat treatment.

Another object of the invention is to provide mechanism for automatically stretching a coiled filamentary body and for subjecting said stretched body to an intermittent heat treatment.

Another object of the invention is to provide a mechanism for receiving and stretching a coiled body and for intermittently heating the body while passing through an inert environment.

Other objects and advantages of the invention will be more fully understood from the following description together with the accompanying drawings in which, Fig. 1 is a side elevational view of a machine embodying the present invention with gas chamber removed.

Fig. 2 shows a section of filament after a stretching operation has been performed.

Fig. 3 is an enlarged detail view showing feed side of the machine and internal structure.

Fig. 4 is an enlarged view of a pawl and ratchet drive mechanism including cam elements for operating the same as well as other movable parts.

Fig. 5 is a fragmentary view showing a portion of the pawl and ratchet mechanism.

Fig. 6 is a plan view of a portion of the machine taken on line VI—VI in Fig. 4 and showing that half of the machine which includes driving mechanism.

Fig. 7 is a fragmentary detail, sectional view taken on line VII—VII in Fig. 6.

Fig. 8 is a section taken on line VIII—VIII in Fig. 1.

Fig. 9 is a view taken on line IX—IX in Fig. 3 and shows the side of the machine opposite to that shown in Fig. 6.

Fig. 10 is a view taken on line X—X in Fig. 3.

Fig. 11 shows the jaws illustrated in Fig. 10 but in position to grip filament.

Fig. 12 is an end view of the jaw mechanism for gripping a filament with the face plate in position.

Fig. 13 is a view taken on line XIII—XIII in Fig. 10.

Fig. 14 is a view taken on line XIV—XIV in Fig. 13.

Fig. 15 is a detail plan view of a shaft and cam elements thereon for operating a plurality of contacts.

Fig. 16 is an end view of the cams and contact elements shown in Fig. 15 partly in section.

Fig. 17 is a perspective view of one of the cam elements to more clearly show its physical formation.

Fig. 18 is a perspective view of a contact element.

Fig. 19 shows a section of coiled filament wire ready to be stretched.

Fig. 20 shows a portion of feeding mechanism with the coil thereon.

Fig. 21 shows a guide for directing a coiled section to be positioned for application for adjustment to be applied to a pair of jaws.

Fig. 22 shows a positioned coil gripped by a pair of jaws, the jaws being partly shown in section.

Fig. 23 shows a pair of jaws separated to stretch a coil held therebetween.

Fig. 24 is a diagrammatic illustration of the electrical circuit, for the passage of electrical energy through the coils at different stages of their movement while held between the jaws.

Fig. 25 is a fragmentary detail view showing a discharge mechanism ready to receive a stretched coiled section, and Fig. 26 is a view of the mechanism shown in Fig. 25 but in position to be actuated for the discharge of a stretched coiled section.

A practical embodiment of the invention may comprise a feeding mechanism A (see Fig. 3) disposed adjacent to a vertical conveyor B. The conveyor B may consist of a pair of ring-like members 10 and 11 held in spaced relation by separators 12 and secured in position by through bolts 13 (see Fig. 1).

The present mechanism will be more clearly understood by first considering the conveyor B and the mechanism for causing an intermittent rotation thereof. The member 10 of the conveyor may be provided with a hub 14 and may be secured to one end of a shaft 15 rotatable in a bracket 16 secured by a foot piece 17 to a bed plate 18. The opposite end of the shaft 15 is provided with a ratchet wheel 19 (see Figs. 4 and 5) movable through the agency of a pawl or a dog 21 carried on an arm 22 rockable on shaft 15.

By means of the ratchet wheel and dog the conveyor B is moved intermittently through motion transmitted from a main driving shaft 23. This shaft may be connected by means of a chain 24 (Fig. 6) to any suitable source of power, as for example, a motor (not shown).

Mounted on the shaft 23 is a cam 25, having disposed in contact therewith a roller 26. This roller is mounted at the free end of the arm 22 upon which the dog 21 is carried. The said dog is pivoted to the arm 22 at 27 and a spring 28 having one end secured to the arm and the other end secured to an extension 29 on the dog normally urging a tapered end or tooth 31 of the dog toward the ratchet wheel to engage said end in one of a series of notches 32 provided in the wheel. Thus when the cam 25 rotates the arm 22 is oscillated and as it moves in the direction of the arrow "Y" it is connected with the ratchet wheel by reason of the dog 21 causing the ratchet wheel and consequently the conveyor to move a given number of degrees about its axis of rotation. When the cam 25 has completed its travel for effecting an upward movement of the arm 22, the arm is returned to its lower position by means of a spring 33 having one end secured to a stationary portion of the machine and its opposite end secured at 34 to the arm 22.

The spring 33 may be sufficiently stronger than the spring 28 so that after being expanded during an upward movement of the arm 22, a contraction thereof will overcome the force of the spring 28 and as the arm 22 moves through its return path, the tapered end 31 of the dog 21 will be removed from the notch it occupied and be disposed in a succeeding or lower notch.

It is essential however to provide the conveyor with a means for locking it in its position during a stationary stage. For this purpose a lock member 35 is provided slidable vertically in a housing 36. The said lock member is actuated in one direction by the cam 25 through the agency of a bell-crank member 37 pivoted at 38. One arm 39 of the bell-crank is provided with a roller 41 disposed in contact with the cam 25. The opposite arm 42 of the said bell-crank is provided with an end-slot 43 positioned to embrace a pin 44 extending from the lock member 35 so that when the bell-crank 37 is rocked by reason of a rotation of the cam 25, the bell-crank will operate to remove the lock member 35 from a notch 32 when the ratchet mechanism is operated to rotate the conveyor. When the conveyor reaches a rest period, the lock member (see Fig. 5) is moved into a notch under the action of an expansion spring 45.

The foregoing description sets forth the mechanism for effecting an intermittent rotation of the conveyor. The present machine is so arranged that during each rest period of the conveyor a coiled unstretched section of filament 46 is fed to position to have its ends secured by oppositely disposed gripper members 47 and 48 (see Figs. 10 to 14). The gripper-members are mounted in spaced relation on the ring-like members 10 and 11 of the conveyor and arranged in spaced relation so that a gripper-member 47 is disposed in opposite and operative relation to a gripper member 48, and as these gripper members operate in pairs they may be termed pairs of jaws. Any desirable number of pairs of jaws or gripper members may be employed. The gripper members are of similar construction and a description of one, insofar as the actual filament gripping mechanism is concerned, will answer for both.

Each of the gripping members is provided with a cam member 49 (see Fig. 13) secured to a shaft 51, the said cam member is provided with a contact surface 52 movable upon a rotation of the shaft 51 to and from a stationary contact surface 53. The shaft 51 extends through a hollow spindle 54 having a flange 55 to which a face plate 56 is secured by tap bolts 57, the flange and face plate 56 being disposed in spaced relation to provide a housing for the cam 49.

An aperture 58 is provided in the face plate 56 for the entrance of a filament end to be secured by the contact surfaces 52 and 53. The cam 49 is normally actuated so that the contact surface 52 is urged toward the contact surface 53. This is accomplished by means of a helical spring 59 having one end 61 secured to a stop collar 62 on the spindle 54 and the opposite end secured to a hub 63 of a lever arm 64 so that the torsional or unwinding action of the spring serves to normally actuate the jaw 49 of the gripper member. Means for actuating the jaws 49 will be hereinafter described.

The gripper members are normally retained in separated relation and it is necessary to move the gripper members toward the coil ends to position said ends in the aperture 58 and in position to be gripped by the contact surfaces 52 and 53, after which the gripper members are separated to stretch the gripped coil. Means for effecting a movement of the gripper members may comprise an arm 65 for the gripper member 48 and an arm 65' for the gripper member 47. The said arms 65 and 65' may be provided with set screws 66 and 66' arranged to contact with the collars 63. As above mentioned the gripper members are normally held in their separated positions and a helical spring 67 disposed between the collar 62 and a bushing 68 on the conveyor is provided to normally effect such separation.

For the purpose of holding the gripper members from rotation during endwise movement, slide pins 69 are provided extending from the flange 55 and slidable in apertures 71. Mechanism for causing a movement of the gripper members toward each other may comprise a cam element 72 (see Figs. 4, 6 and 7). This element is mounted on the main driving shaft 23 and is provided with a lateral cam face 73. A cam follower or roller 74 mounted on a rocker arm 75 is arranged to engage the surface 73, the arm 75 being provided with a hub 76 pivotally mounted on a stub shaft 77. The free end 78 of the arm 75 is pivotally connected at 79 with one end of a link 81, the opposite end of the link 81 is pivotally connected at 82 with an end 83 of a lever 84 pivoted at 85 and an opposite end 86 of the lever 84 is pivotally connected at 87 with an actuating link 88 pivotally connected at 89 with a head 91 slidable in guides 92 and 93 and secured to a hollow spindle 94. The lever 84 is also pivotally connected at 95 with one end of a link 96 the opposite end of which is pivoted at 97 with a head 98 slidable between the guides 92 and 93 and secured to a shaft 99.

A rotation of the cam element 72 will cause a reciprocation of the shaft 99 and the spindle 94 in opposite directions and consequently an endwise movement of the gripper members 47 and 48 toward one another, when positioned during a stationary stage of the conveyor B between arms 65 and 65' at which time the jaws of the gripper members are actuated to grip the filament.

The foregoing description sets forth the operation of the jaws and their relative movement to stretch a coil. The coils are, however, extremely flexible and not easily handled so that means must be provided for feeding and adjusting each coil preparatory to reception by the jaws.

Means for feeding the coils may comprise a platform 101 (see Fig. 3). The platform is provided with slots 102 through which ends 103 of sets or rows of push-fingers 104 extend. The said fingers are mounted on and extend upwardly from a crank 105. One end 106 of the crank is provided with a roller 107 disposed in a guide slot 108 provided in a bracket plate 109. The opposite end of the crank 105 is connected by a wrist pin 111 to an eccentric 112 on the main shaft 23 which is journaled in suitable bearing brackets. By reason of the crank 105 the push-fingers 104 are given a forward and backward as well as an up and down movement relative to the platform 101 so that when a coil is laid on the platform transverse to the backward and forward path of movement of the ends 103 of the push-fingers one forward movement of a set of fingers will advance a coil a given distance ready to be advanced by another set of fingers. The fingers then descend below the platform and the next upward movement of the fingers causes the next set of fingers to engage and advance the coil. A continuation of the crank movement advances the coil to a guide chute 116 down which it falls by gravity to an adjuster device 117 (see Figs. 3, 8, 10 and 21).

The adjuster device may comprise a support including an inclined plate 118 and a normally inclined trap-door 119. The trap door 119 is secured to a suitable pintle and a coiled spring 122 having an end 123 secured to a bearing 124 and the other end 120 secured to the door 119 holds the latter normally closed. The inclined plate 118 in conjunction with the closed door 119 forms a pocket to temporarily hold a coil which drops from chute 116. The coil may not, however, lie in the required position so an adjuster block 125 is provided to engage with an end of the coil to adjust it to position on the door 119. The adjuster block is attached to one end of a push-rod 126 (see Fig. 10), the other end of the push-rod is provided with a slotted collar 127 to receive a bifurcated end 128 of a lever-member 129 (see Fig. 3).

This lever member is pivoted at 131 in a bearing 132. The opposite end of the lever-member 129 is provided with a roller 133 held by means of a spring 134 in contact with a cam face 135 of a cam 136 secured to shaft 23.

A rotation of the shaft 23 will cause an oscillation of the lever-member 129 and consequently actuate the adjuster block 125 to move a coil 46 to position on trap-door 119 for deposit into a V-shaped support 137 (see Figs. 3, 8, 10 and 21).

For the purpose of opening the trap-door 119 the same is provided with a shaft 121' extending from the pintle 121. The shaft is provided with an arm 122' arranged to be engaged by a lever 123' (see Fig. 3) on shaft 124' which shaft is actuated by mechanism to be later described. When the shaft 124' is given a partial rotary movement the lever 123' engages the arm 122' and the trap-door is opened causing the coil to drop into the V-shaped support 137.

When the coil rests in the support 137 it is ready to have its ends gripped by the gripper-members 47 and 48. After the gripper members secure a coil the V-shaped support is removed and mechanism for this purpose may comprise a head 138 (Fig. 8) upon which the V-shaped support is mounted. The head may be movable vertically in guides 139 and 141 and may be provided with a pin 142 to receive a forked end 143 of an arm 144 pivoted at 145.

The arm 144 is provided with a roller 146 held in contact with a cam member 147 by a spring 148 which urges the arm 144 upwardly. A rotation of the cam member 147 will cause an actuation of the arm 144 and a consequent vertical reciprocation of the head 138 to move the V-shaped support into position to hold a coil for reception by the gripper-members 47 and 48 and to move the head to lower the V-shaped support to remove it from the path of movement of the coil with the gripper members.

When the gripper members 47 and 48 have secured the ends of a coil 46 the conveyor moves the said members and coil through a series of steps during which the coil is first flashed, i. e. heated to a given temperature in air, then passed through a chamber 150 containing an inert gas and while moving through the gaseous atmosphere the coil is intermittently flashed.

Means for performing the flashing operations may comprise a plurality of contact cams 151 (see Fig. 9, 15 to 16 and 24) rotatable with shaft 23. Each of the contact cams is arranged to engage with a spring contact 152 and as shown in Fig. 16 the cams 151 engage contact surfaces 153 on spring arms 154. These arms may be secured at one end to, and suitably insulated from, a post 155, the free ends of the arms being provided with contacts 156 engageable with stationary contacts 157.

The contacts 157 are adjustable and extend from one end of conductors 158 which are secured to and insulated from a block 159. The opposite ends of the conductors 158 may be provided with binding posts 161 to receive lead wires 162 connected with brushes 163 arranged to make electrical contact with gripper-members 48. The spring contacts 152 may be connected to a conductor 164 leading from one side of a source of electrical energy as for example a generator (not shown). The opposite side of the said source may comprise a lead-wire 165 connected with brushes 166 arranged to make electrical contact with gripper members 47. The contact cams 151 may be so arranged and timed that when the conveyor B moves to a given position a given cam will engage a spring contact 152 and a flow of electrical energy will pass through a gripped coil to heat the same.

After the conveyor B has moved to pass the coils through the chamber 150 the gripper-members 47 and 48 are moved to unloading position. Mechanism for releasing the coils may comprise contact-arms 160 which engage arms 64 on the gripper members. The arms 160 are secured to a rock-shaft 166 mounted in a bearing bracket 167 (see Fig. 4). The rock-shaft 166 is provided with an arm 168 connected by a link 169 with an arm 171 of a bell-crank 172 which is mounted on the rock-shaft 124' which also carries contact arms 170 which operate to engage arms 64 to open the jaws of the gripper members 47 and 48 at the loading position to receive coils from the support 137. It will be noted that the shaft 124' also carries the lever 123' to open the trap-door 119 at the loading position.

An opposite or long arm 174 of the bell-crank 172 is provided with a roller 175 which engages surface 176 of a cam 177 mounted on and rotatable with shaft 23. The roller 175 is normally held in contact with the cam surface 176 by a helical spring 177' (see Fig. 6) having one end secured to the bearing 167 and the other end secured to the shaft 166.

A rotation of the cam 177 oscillates the bell-crank 172 thereby translating motion to the rock shafts 166 and 124' causing the contact-arms 160 and 170 to engage arms 64 of the gripper members 47 and 48 at the discharge stage and the receiving stage respectively.

When a coil is ready to be released from the gripper members 47 and 48 a pair of lifter-fingers 178 and 179 (see Figs. 3, 8, 9, 25 and 26) are actuated to grip the coil just prior to its release from the said gripper members.

The lifter-finger 178 is mounted on an arm 181 pivoted at 182 in a bearing bracket 183. The pivotal connection between the arm 181 and the bracket may be such that a movement of the arm 181 is opposed by a suitable amount of friction so that its movement will not be too rapid. The lifter finger 179 is mounted on an arm 184 loosely pivoted at 185 to the arm 181. Means for actuating the arms 181 and 184 may comprise a bent extension link 186 (see Figs. 3 and 9). An end 187 of the link 186 is pivotally connected at 188 to the arm 184. The opposite end 189 of the link 186 is pivoted at 191 to one end of a lever 192 fulcrumed at 193 and having a roller 194 intermediate its ends arranged to engage a cam surface 195 of a cam member 196 secured to shaft 23. A rotation of the cam 196 will cause the link 186 to transfer motion to rock the lever 181 through a movement of the arm 184. By reason of the frictional action of the lever 181 the arm 184 will first engage the coil 46 and a continued movement of the link 186 will cause the lever 181 to move and the lifter fingers 178 and 179 to secure and lift the coil at which time the coil will be released from the gripper members 47 and 48 which then move with the conveyor B. At this time the link 186 is given a return movement and the arm 184 rocks to separate the lifter-fingers 178 and 179 and the coil is dropped in to receptacle 196'. A stop pin 197 is provided on the lever 181 so that after the arm 186 has moved a sufficient distance to release a coil it will be contact with the stop pin so that a further movement of the link 186 will position the lifter fingers to grip another coil from another set of gripper-members.

It will be understood that the present machine will operate to stretch a helically coiled section to a definite length. This is accomplished by the movement or separation of the gripper-members which by reason of their construction all move a predetermined distance. The coiled sections to be stretched are wound with a given pitch so that when stretched the pitch is increased but the number of turns is not changed. The short section of turns secured by the jaws of the gripper members are obviously not stretched but inasmuch as the ends of the coils are secured by welding or clamping to lead wires of a lamp the close winding at the filament ends offers no disadvantage.

In an operation of the machine, coiled filamentary sections 46 are deposited on the platform 101. Assuming the machine to be in operation the crank-shaft 105 will be given a cycle of motion to cause the pusher fingers 104 to advance the coil to the chute 116. The coil passing down the chute will fall into the temporary support including the trap-door 119 preparatory to being adjusted for deposit in the V-shaped support 137. When the filament is positioned on the trap-door 119 the adjuster block 125 is actuated so as to engage an end of the filament and position it ready for discharge from the trap door at which time the trap-door is opened by an actuation of lever 122' and a filament drops into the support 137.

The gripper members 47 and 48 are at this time positioned at opposite sides of the support 137 and the lever arm 75 operates to cause a movement of the said members toward each other and at the same time contact-arms 170 on rock-shaft 124' operate to engage arms 64 on gripper members 48 and 47 respectively to actuate the cams 49 and separate the contact surfaces 52 and 53'.

As the gripper members move toward each other the ends of the filament enter apertures 58 in the face plate 56. The contact-arm 170 then move permitting the contact surface 52 and 53 to grip the ends of the filament and as the conveyor moves the gripper-members are released from between the arms 65 and 65' permitting the said gripper members to separate under the action of springs 67 and stretch the filament.

As the conveyor moves the gripper members reach position D (see Fig. 8) at which position brushes 163 and 166 make contact so that a flow of electrical energy passes through the filament to heat the same. In the position D the filament is heated in air preparatory to passing into chamber 150 containing an inert gaseous atmosphere.

As the gripper members move the filament through the said chamber a plurality of pairs of brushes 166 and 163 make contact with opposite gripper members so that the filament is flashed during a plurality of rest stages throughout the travel of the conveyor.

When the filament reaches position E the lifter fingers 178 and 179 are operated to grip the filament and the jaws of the gripper-fingers 47 and 48 are actuated to release the ends of the filament. The gripper fingers are then operated to release the filament and deposit it in a suitable receptacle 196.

From the foregoing it will be evident that filaments may be fed to the present machine and automatically stretched and flashed without manual handling. It will be obvious that if desirable the operation of heating in air may be dispensed with and that if desirable a greater or lesser number of flashing operations may be provided and that such flashing operations may be formed at any suitable voltages or that the voltage of flashing may vary or constitute a flashing schedule, as for example, a voltage gradient may be provided so that the filaments are flashed at, say, a low voltage and at progressively higher voltages throughout the treatment.

By reason of the present invention an automatic and effective mechanism is provided for the performance of the delicate operation of stretching of lamp filaments and it is to be understood that although a preferred embodiment of the invention is shown herein modifications may be made therein without departing from the spirit and scope of the invention as set forth in the appended claims.

What is claimed is:

1. A machine for stretching helical coils comprising a conveyor, a plurality of pairs of jaws mounted on said conveyor, coil feeding means, means for supporting a coil received from said feeding means, means for actuating said conveyor to dispose a pair of jaws adjacent to the ends of said positioned coil, means for actuating said jaws to secure said coil, means for separating said pairs of jaws to stretch said coil and means for moving said conveyor to position another pair of jaws to receive a coil.

2. A machine for stretching helical coils comprising a conveyor, a plurality of pairs of jaws mounted on said conveyor, coil feeding means, means for supporting a coil received from said feeding means, means for actuating said conveyor to dispose a pair of jaws adjacent to the ends of said positioned coil, means for actuating said pairs of jaws to receive said coil, means for separating said pairs of jaws to stretch said coil and means for passing electrical energy through said stretched coil to heat the same.

3. A machine for stretching a helically coiled lamp filament comprising a gas containing chamber, a conveyor movable through said chamber, a plurality of pairs of jaws mounted on said conveyor, means for supporting a filament, means for actuating a pair of said jaws to grip the ends of said positioned filament, means for separating said pairs of jaws to stretch said filament, means for heating said stretched filament and means for moving the filament through said chamber.

4. A machine for stretching a helically coiled lamp filament comprising a gas containing chamber, a conveyor movable through said chamber, a plurality of pairs of jaws mounted on said conveyor, means for supporting a filament, means for actuating a pair of said jaws to grip the ends of said positioned filament, means for separating said jaws to stretch said filament, means for heating said stretched filament, means for moving said filament through said chamber and means for intermittently heating the filament.

5. A machine for stretching a helically coiled lamp filament comprising a gas containing chamber, a conveyor movable through said chamber, a plurality of pairs of jaws mounted on said conveyor, means for supporting a filament, means for actuating a pair of said jaws to grip the ends of said positioned filament, means for separating said pairs of jaws to stretch said filament, means for heating said stretched filament, means for moving said filament through said chamber and means for intermittently heating the filament during its passage through said chamber.

6. A machine for stretching a helically coiled lamp filament comprising a gas containing chamber, a conveyor movable through said chamber, a plurality of pairs of jaws mounted on said conveyor, means for supporting a filament, means for actuating a pair of said jaws to grip the ends of said positioned filament, means for separating said pairs of jaws to stretch said filament, means for heating said stretched filament, means for moving said filament through said chamber and means for passing electrical energy through said coils during their passage through said chamber.

7. A machine for stretching a helically coiled lamp filament comprising a gas containing chamber, a conveyor movable through said chamber, a plurality of pairs of jaws mounted on said conveyor, means for supporting a filament, means for actuating a pair of said jaws to grip the ends of said positioned filament, means for separating said jaws to stretch said filament, means for heating said stretched filament, means for moving the filament through said chamber and means for removing said filament from said jaws.

8. A machine for stretching a helically coiled lamp filament comprising a gas containing chamber, a conveyor movable through said chamber, a plurality of pairs of jaws mounted on said conveyor, means for supporting a filament, means for actuating a pair of said jaws to grip the ends of said positioned filament, means for separating said jaws to stretch said filament, means for heating said stretched filament, means for moving said filament through said chamber, means for intermittently heating the filament and means for removing said filament from said jaws.

9. A machine for stretching a helically coiled lamp filament comprising a gas containing chamber, a conveyor movable through said chamber, a plurality of pairs of jaws mounted on said conveyor, means for supporting a filament, means for actuating a pair of said jaws to grip the ends of said positioned filament, means for separating said jaws to stretch said filament, means for heating said stretched filament, means for moving said filament through said chamber, means for intermittently heating the filament during its passage through said chamber, gripping means for securing said filament intermediate its ends and means for actuating said gripping means to discharge said filament.

10. A machine for stretching helical coils comprising coil supporting means, means for progressively feeding coils to said supporting means, a plurality of coil stretching means, means for moving said coil stretching means progressively to position adjacent to said coil supporting means, means for actuating said means to stretch coils fed to said supporting means.

11. A machine for stretching helical coils comprising coil supporting means, means for feeding coils individually to said supporting means, a plurality of coil stretching devices having pairs of jaws for gripping ends of supported coils, means for moving said devices to position ends of supported coils in said jaws, means for actuating said jaws to grip the ends of coils and means for separating said pairs of jaws to stretch a gripped coil.

12. A machine for stretching helical coils comprising coil feeding means, coil supporting means, a plurality of coil stretching devices having pairs of gripper members, means for moving said devices to position to engage ends of a supported coil by said gripper members and means for separating said pairs of gripper members to stretch a gripped coil.

13. A machine for stretching helical coils comprising coil feeding means, coil supporting means, a plurality of coil stretching devices having pairs of gripper members, means for moving said devices to position to engage ends of a supported coil by said gripper members, means for separating said pairs of gripper members to stretch a gripped coil, means for moving said gripper-members and said stretched coil through a given path and means for heating said coil.

14. A machine for stretching helical coils comprising coil feeding means, coil supporting means, a plurality of coil stretching devices having pairs of gripper-members, means for moving said devices to position to engage ends of a supported coil by said gripper members, means for separating said pairs of gripper members to stretch a gripped coil, means for moving said gripper members and said stretched coil through a given path, means for heating said coil and means for actuating said members to release said stretched coil.

15. A machine for stretching a helical coil comprising means for supporting a coil with the ends exposed, means for feeding coils, coil stretching means, means for moving said coil stretching means to position to grip the exposed ends of said coil and means for actuating said stretching means to stretch said coil.

16. A machine for stretching a helical coil comprising means for supporting a coil with the ends exposed, means for feeding coils, coil stretching means, means for moving said coil stretching means to position to grip the exposed ends of said coil, means for moving said stretching means with said gripped coil and means for actuating said stretching means while moving to stretch said coil.

17. A machine for stretching a helical coil comprising means for supporting a coil with the ends exposed, means for feeding coils, coil stretching means, means for moving said coil stretching means to position to grip the exposed ends of said coil, means for moving said stretching means with said gripped coil, means for actuating said stretching means while moving to stretch said coil and means for heat treating said stretched coil.

18. A machine for stretching a helical coil comprising means for supporting a coil with the ends exposed, means for feeding coils, coil stretching means, means for moving said coil stretching means to position to grip the exposed ends of said coil, means for moving said stretching means with said gripped coil, means for actuating said stretching means while moving to stretch said coil, means for heat treating said stretched coil and means for releasing said coil.

In testimony whereof, I have hereunto subscribed my name this 16th day of May, 1929.

ROBERT BRINDLE, JR.